United States Patent [19]
Glass

[11] Patent Number: 4,947,801
[45] Date of Patent: Aug. 14, 1990

[54] ANIMAL TETHERING APPARATUS FOR USE IN VEHICLES

[76] Inventor: Sammie K. Glass, 13387 Concow Rd., Oroville, Calif. 95965

[21] Appl. No.: 342,030

[22] Filed: Apr. 24, 1989

[51] Int. Cl.[5] .................................................. A01K 3/00
[52] U.S. Cl. ....................................... 119/120; 119/96
[58] Field of Search .......................... 119/96, 120, 109; 54/34

[56] References Cited

U.S. PATENT DOCUMENTS

| | | | |
|---|---|---|---|
| 2,695,052 | 11/1954 | Yates et al. | 119/96 X |
| 2,909,154 | 10/1959 | Thomas | 119/109 |
| 4,252,084 | 2/1981 | Willow | 119/96 |
| 4,488,511 | 12/1984 | Grassano | 119/109 |
| 4,676,198 | 6/1987 | Murray | 119/96 |
| 4,791,886 | 12/1988 | Anderson | 119/120 |
| 4,827,876 | 5/1989 | Krekelberg | 119/120 X |
| 4,834,027 | 5/1989 | Meyer | 119/96 X |

FOREIGN PATENT DOCUMENTS

| | | | |
|---|---|---|---|
| 2547988 | 4/1977 | Fed. Rep. of Germany | 119/109 |
| 0588954 | 1/1978 | U.S.S.R. | 119/109 |

*Primary Examiner*—Robert P. Swiatek
*Assistant Examiner*—T. Manahan

[57] ABSTRACT

An apparatus primarily for use with dogs which prevents the animal from jumping or being thrown from the open bed of a pickup truck. The apparatus uses a main cable removably attached at one end to a hinge mounted to the front panel of the truck bed. The opposite end of the main cable is removably attached to a second hinge mounted to the truck bed floor adjacent the tailgate. Attached generally centrally on the main cable are two spaced cable clamps. The position of the two cable clamps is adjustable on the main cable. A short leash is removably and slidably attached to the main cable between the two cable clamps. The opposite end of the leash removably attaches to the collar of an animal. The frontward to rearward movement of the animal in the truck bed may be controlled by locating the cable clamps on the main cable to prohibit the leash from sliding excessively close to one end of the other of the truck bed. At least one shock absorbing device is provided in-line with the tethering apparatus to protect against injury to the animal's neck from sudden movements of the vehicle or impulsive lunges by the animal himself.

5 Claims, 4 Drawing Sheets

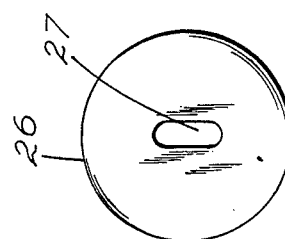
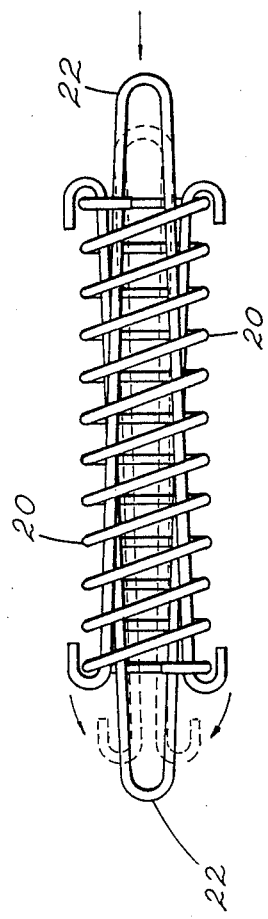
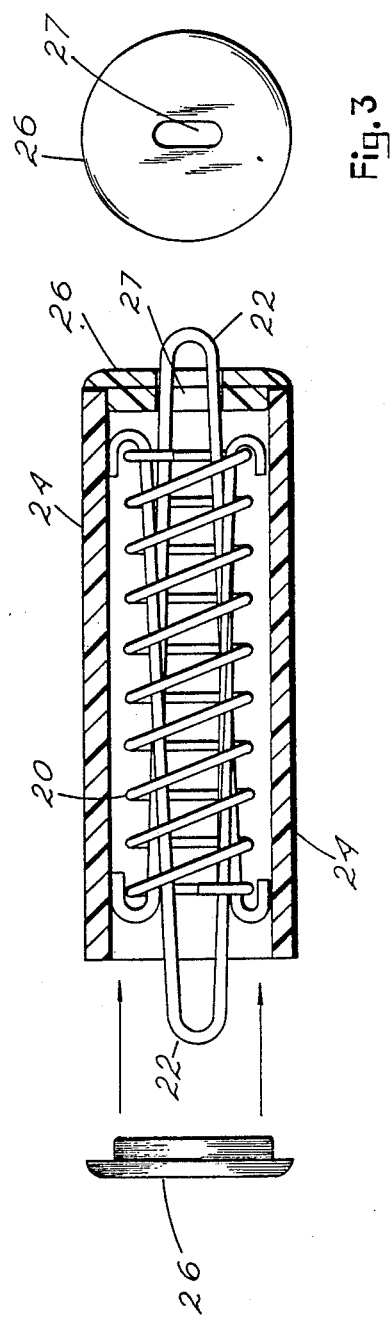

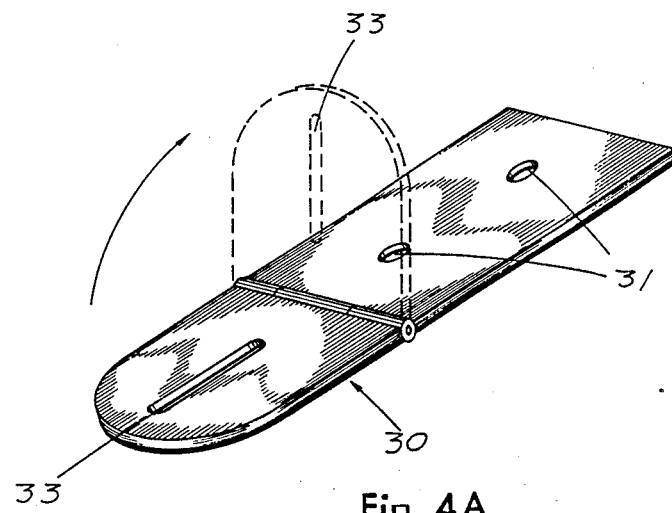
Fig. 4A
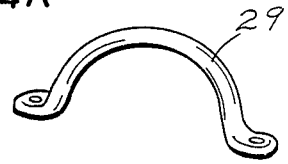
Fig. 4B
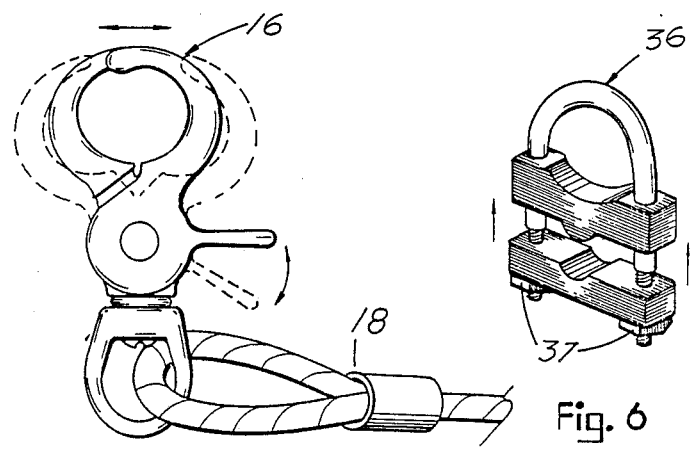
Fig. 5
Fig. 6

ANIMAL TETHERING APPARATUS FOR USE IN VEHICLES

BACKGROUND OF THE INVENTION

1. Field of the Invention:

This invention relates to animal tethering devices. More particularly, the invention relates to tethering devices used to prevent a dog from jumping or falling from the opened cargo bed of a pickup truck or similar vehicle.

2. Description of the Prior Art:

In a growing number of states in the United States, the law now requires animals such as dogs to be tethered inside the open cargo beds of pickup trucks when riding in that particular area. The tethering is to prevent injury to the animals should they jump or fall out. The majority of animal owners simply fasten a short rope or chain to the front of the truck bed and attach the tether to the animal's collar. While this method may meet the minimal requirements of the law, it limits the animal's range of movement, comfort and safety within the bed of the truck.

People often carry valuable items in the open beds of their trucks which they sometimes expect their dog to guard. If the dog is restrained to the front end of the bed he cannot sufficiently guard the back end. Another disadvantage of simple tethers and leashes is that they have relatively little or no give when stretched tight. Sudden movement or stopping of the vehicle, or bolting by the animal can result in serious neck injuries when the animal reaches the maximum extension of the tether. Also, if the animal is tethered too close to either the front end panel adjacent the cab, or tailgate panel of the truck bed, he can be injured by slamming into one of the panels during hard braking or when in an accident.

Of the known prior art animal tethering devices for use in a truck or other vehicle, none appear to suitably address both the range of movement problem and the potential danger of injury with an animal tethering apparatus structured as my invention.

SUMMARY OF THE INVENTION

In practicing my invention I have provided an adjustable tethering apparatus adapted to safely retain animals within the cargo beds of pickup trucks. The apparatus will also function well in the cargo areas of other vehicles such as flatbed trucks, vans and station wagons, however it is primarily for pickup trucks.

My apparatus is comprised of a main length of cable extending in parallel alignment with the lengthwise sides of the truck bed. One end of the main cable has a permanently attached swivel snap connector. The opposite end of the main cable has an affixed shock absorber and a swivel snap connector affixed terminally to the opposite end of the shock absorber. The main cable is removably affixed at the front end to the upper front wall of the pickup bed, and at the opposite end of the cable to the floor of the truck bed toward the tailgate. The openable snap connectors allow removable attachment of each end of the cable assembly to low-profile hasp-like hinges fastened one to the front wall adjacent the cab, and one to the floor of the truck bed. The rearward hinge attached to the bed floor is sufficiently narrow to fit between the corrugations common to most pickup truck bed floors. This narrow, low profile hinge is designed to lie recessed or flush with the top surface of the corrugations when not in use. The recessed fit of the hinge leaves the upper surface of the floor smooth, allowing unobstructed sliding of cargo in and out of the bed. The hasp-like hinge attached to the front of the truck bed folds flat, completely out of the way when not in use.

Attached generally centrally on the main cable between the two swivel snap connectors are two adjustably positionable cable clamps or stops spaced apart from each other a short distance. Slidably and releasably attached to the main cable between the two cable clamps is one end of a short flexible leash or tether. The leash has a first swivel snap connector at one end to allow the releasable attachment of that end to the main cable between the two cable clamps. The first swivel snap connector is sized large enough to allow sliding movement along the main cable between the two cable clamps, and small enough to prohibit the snap connector from sliding over and beyond the cable clamps. The cable clamps are adapted to be adjustably positioned on the main cable to allow limiting the movement of the leash towards and away from the front and back panels of the truck in order to prohibit the animal from slamming into one of the panels during an accident.

Attached in-line between the first swivel snap connector and the leash is a spring biased shock absorber. A second swivel snap connector is attached to the opposite end of the leash for releasable attachment of the leash to an animal's restraint device such as a collar or harness.

When the invention is properly arranged using the correct length of leash, and having the cable clamps spaced properly, the apparatus allows an animal access to nearly the entire truck bed, yet restrains the animal from jumping or falling out. The invention when properly adjusted also prevents the animal from being thrown into the end panels of the truck bed. The shock absorbers used in the invention extend the maximum length of the cables a short distance when under load. This extending action serves to bring the animal to a slower, less abrupt halt. Both shock absorbers work in conjunction to lessen the shock to the animal when the vehicle comes to an abrupt stop or if the animal forcefully lunges forward.

More than one leash may be attached to the main cable for restraining two or more animals at a time. Also, more than one set of cable stops may be used with multiples of leashes attached to the main cable.

Both the leash and main cable are useful either together or separately as animal tethering or walking leashes outside of the vehicle if desired. The spring biased shock absorbers used in the invention are adapted for use as leash handles, serving as a comfortable location for a person to grasp. The shock absorbers still function to absorb shock when either the main cable or leash is used to walk or tether an animal.

When the main cable and leash are used together as walking leashes for two dogs, the user holds onto the shock absorber of the main cable. One dog is attached to the short leash which is attached at the first end to the main cable, and a second dog is attached to the end of the main cable opposite the shock absorber.

Therefore, it is a primary object of my invention to provide a safe animal tethering apparatus for vehicles which allows the animal access to nearly the entire cargo bed of the truck while still prohibiting the animal from jumping or falling out.

Another object of my invention is to provide an animal tethering apparatus for vehicles which provides a shock absorbing means adapted to help prevent neck injury to the animal caused from abrupt stops of the vehicle or sudden lunges from the animal itself.

A further object of my invention is to provide an animal tethering apparatus for vehicles which can be easily disconnected from the vehicle and used as a walking leash.

A further object of my invention is to provide an animal tethering apparatus for vehicles which can be quickly and easily removed to allow full and normal usage of the cargo area of the vehicle.

A still further object of my invention is to provide an animal tethering apparatus which helps prevent the animal from being thrown against wall panels of the cargo area during sudden stops.

Other objects and advantages will become apparent with a reading of the remaining specification and comparison with the accompanying drawings.

BRIEF DESCRIPTION OF THE DRAWINGS

FIG. 1 is a side view of the compression spring and connecting attachment eyelets of the preferred spring biased shock absorber used in the invention. This particular shock absorber uses a compression spring arranged to function similar to that of an extension spring. The outer housing of the shock absorber is not shown in this view.

FIG. 2 is a partial cross sectional side view of the shock absorber showing the compression spring, the outer housing, housing end caps, and attachment eyelets at the ends of the shock absorber.

FIG. 3 is a top view of an apertured end cap.

FIG. 4A is a perspective view of the hasp-like hinge used in the invention.

FIG. 4B is a perspective view of a low-profile ring holder bracket illustrating an alternative fixture useful in place of the hasp-like hinge of FIG. 4A.

FIG. 5 is a side view of the preferred swivel snap connector attached to one end of either the main cable or leash.

FIG. 6 is a perspective view of one cable clamp used as a stop for the sliding leash.

DESCRIPTION OF THE PREFERRED EMBODIMENT

Figure 7:
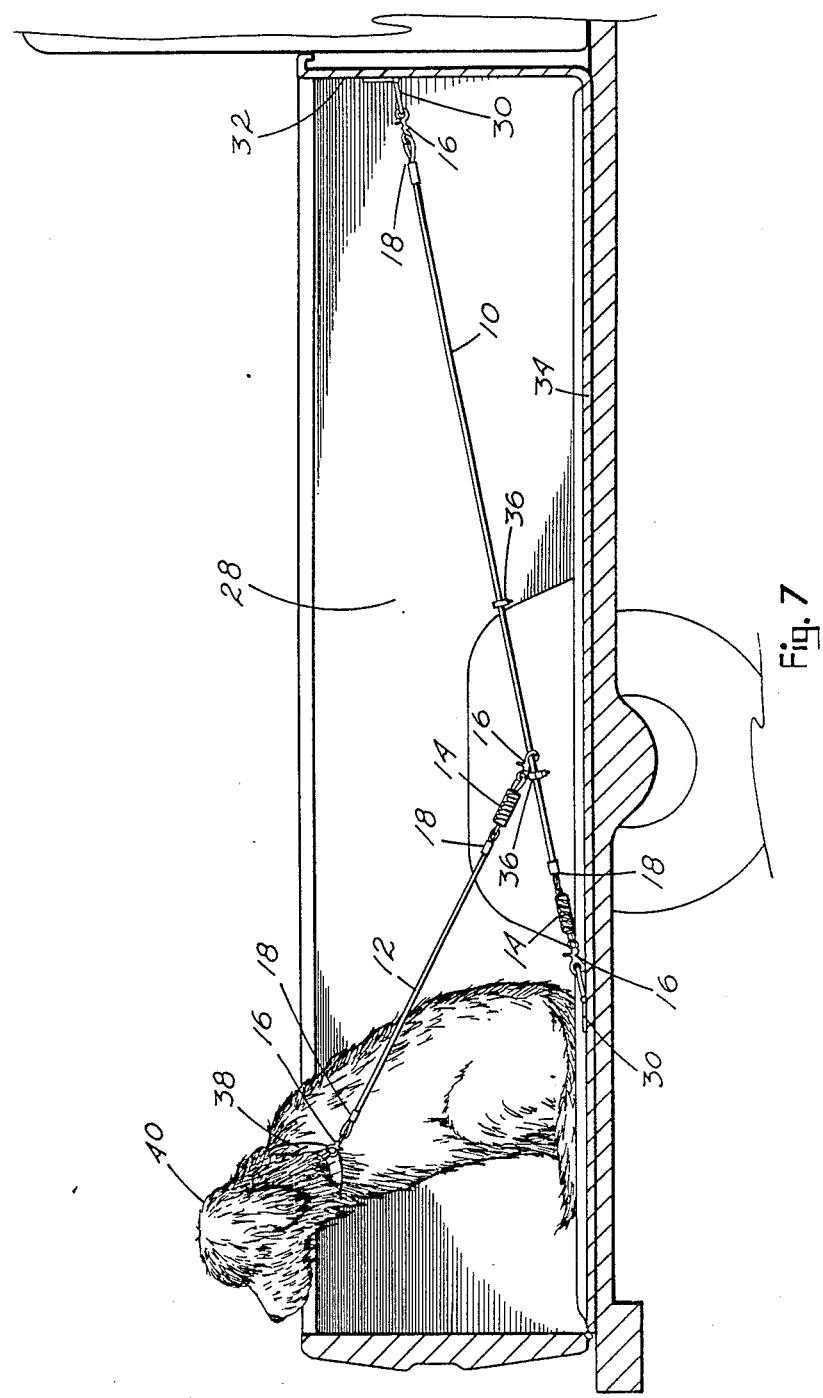
FIG. 7 is an in-use side view of the bed of a pickup truck sectioned to show the animal tethering apparatus securing a dog lengthwise within the truck.

Main cable 10 is a length of flexible rope, chain or cable having a first and second end. Main cable 10 can be manufactured of several materials and function well, however the preferred material is metal cable having an outer plastic jacketing for both strength and durability. Both ends of cable 10 are structured into attachment eyes or loops 18 formed by way of crimped cable couplers. Loop 18 at one end of main cable 10 retains an openable swivel snap connector 16. At the opposite end of main cable 10 is a shock absorber 14 retained at one end by a second loop 18 of the main cable 10. The opposite end of shock absorber 14 of main cable 10 retains a snap connector 16.

An example of one of many available swivel snap connectors 16 is depicted in FIG. 5. Although snap connector 16 is described and shown as being capable of rotating, non-rotating snap connectors 16 will also function suitably well, but are more likely to lead to snarled cables. Snap connectors 16 remain normally closed by way of spring biasing in this example, however suitable connectors which are not spring biased are available and the use of such connectors is anticipated.

An example of the preferred shock absorber 14 is shown in FIGS. 1, 2 and 7. Shock absorber 14 in this particular example consists of a compression spring 20 with two removable interlocking U-shaped attachment eyelets 22, all three of which are enclosed within plastic housing 24 to serve as a handle under certain uses. Each attachment eyelet 22 is an elongated U-shaped metal fitting having outward extending hooked distal ends, shown assembled into spring 20 in FIG. 1 and 2. The U-shaped end of each eyelet 22 forms the attachment end to which snap connectors 16 or loop 18 is affixed as shown in FIGS. 5 and 7. In assembly, each attachment eyelet is passed through opposite ends of the center of compression spring 20 until the hooked distal ends connect around the ends of spring 20 as depicted in FIG. 1 and 2. When spring 20 and attachment eyelets 22 are in plastic housing 24, the U-shaped attachment ends extend outward beyond the opened ends of housing 24. End caps 26, shown in FIG. 2 and 3, are annular discs with central aperture slot 27 which is sized to receive the attachment ends of attachment eyelets 22. End caps 26 are affixed with adhesive or other suitable means over the opened ends of plastic housing 24 and retain spring 20 and attachment eyelets 22 within housing 24.

When shock absorber 14 is stabilized on both ends and a pulling force is applied to one or both attachment ends of attachment eyelets 22, the opposite hooked ends of attachment eyelets 22 engage against the ends of compression spring 20 causing it to compress inward while at the same time allowing the attachment ends of attachment eyelets 22 to extend outward from central slots 27 of both end caps 26. Shock absorber 14 as structured in this example, functions similar to an extension spring providing a shock absorption means which helps prevent neck injury to the animal. Those skilled in the art will recognize assembly in the proper order of the components of shock absorber 14 along with loops 18 and snap connectors 16 is required. Also, I anticipate hydraulic or pneumatic shock absorbers may be used in place of the shown shock absorber 14.

Main cable 10 is endwardly affixed centrally lengthwise to pickup bed 28 by two hasp-like hinges 30. Each hinge 30 is comprised of two flat metal plates attached by a central stable pin. One metal plate of hinge 30 contains mounting bolt apertures 31 while the second metal plate contains an elongated attachment aperture 33 to allow removable connection of snap connectors 16. One hinge 30 is attached to the central upper section of the front panel or wall 32 of pickup bed 28 with the elongated attachment aperture 33 positioned downward. A second hinge 30 is affixed to the central rear section of the corrugated floor 34 of pickup bed 28, preferably positioning hinge 30 flush on a lower surface between two corrugations. Attachment of hinges 30 can be made with nuts and bolts or metal screws. An alternative fixture to hinges 30 is shown in FIG. 4B. The ring holder bracket 29 shown in FIG. 4B is a low profile fixture having apertures to allow screw or bolt mounting.

Figure 8:
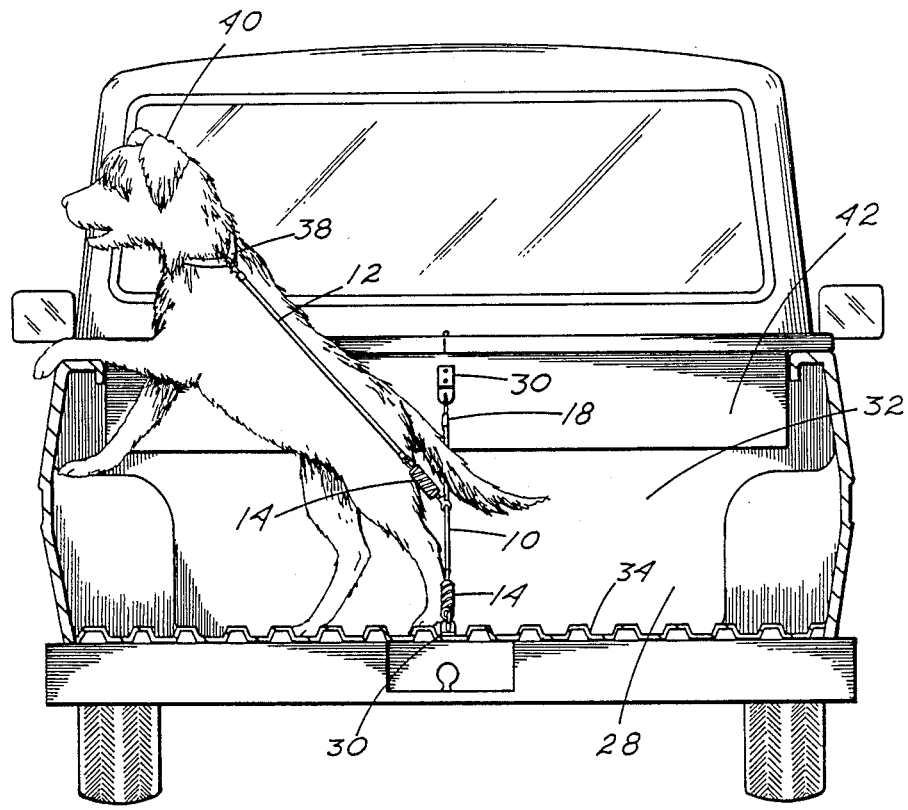
FIG. 8 is an in-use rear view of the pickup bed sectioned to show the device securing a dog transversely within the truck. The front hinge is shown attached by screws to a semi-permanently mounted tool box at the front of the truck bed.

In both FIG. 7 and 8, main cable 10 is shown extending at an angle from the front hinge 30 to the rear hinge 30. When the front hinge 30 is mounted above the floor 34, the main cable 10 does not scratch the paint of the floor. Attachment of both the front and rear hinges 30 to floor 34 will function suitably well, but will lead to additional scratches in the paint.

Main cable 10 connects by way of snap connector 16 snapping into each aperture 33 of hinge 30. When connected, main cable 10 extends from the front hinge 30 to the rear hinge 30, positioned centrally in the truck bed in parallel alignment with the sides of the bed 28. The in-line shock absorber 14 of main cable 10 provides protection to the dog's neck when connected adjacent the rear hinge 30 as shown in FIG. 7 since the dog would normally be thrown forward toward the cab during sudden stops of the truck.

Securely attached to main cable 10 between the front snap connector 16 and shock absorber 14 are two cable clamps 36. Cable clamps 36 are designed to restrict the movement of a second cable assembly or leash 12. Cable clamps 36 are spaced apart from each other a short distance. The distance between clamps 36 is adjustable by way of loosening nuts 37 to reposition clamps 36 on main cable 10. Although cable clamp 36 as shown in FIG. 6 has been found to function suitably well for the intended purpose, it is anticipated other available structures may be used.

Leash 12 may be comprised of the same material as main cable 10, but is preferably of a lighter and more flexible material. Leash 12 is structured similar to main cable 10, with one end formed with a loop 18 retaining one snap connector 16, while the opposite end forms a second loop 18 retaining one end of a shock absorber 14. The second end of the shock absorber 14 of leash 12 retains a snap connector 16. In use, the snap connector 16 which is adjacent shock absorber 14 of leash 12 is connected over main cable 10 between the two cable clamps 36. This connection of leash 12 to cable 10 is adapted to allow the leash 12 to slide up and down on main cable 10 between the two clamps 36. The opposite end of leash 12 is attached to the harness or collar 38 of dog 40, as shown in FIG. 7 and 8. Leash 12 must be sufficiently restricted in length to allow only the dog's head to reach the sides of pickup bed 28 from either side of main cable 10, as depicted in FIG. 8. Both cable clamps 36 may be adjusted along main cable 10 to limit longitudinal movement of dog 40 to protect the animal from slamming against either the front or rear panel of the truck bed 28. The upper cable clamp 36 when properly adjusted prevents dog 40 from reaching the front panel of the truck. The rear cable clamp 36 when properly adjusted prevents dog 40 from jumping or falling out, or slamming into the tailgate of the truck.

Often, pickup trucks have semi-permanently mounted tool boxes at the front of the bed. FIG. 8 illustrates the upper hinge 30 of main cable 10 affixed to the outer wall of an accessory tool box 42 in the front area of pickup bed 28.

Leash 12 can be easily disconnected by openable snap connector 16 from main cable 10 for use in tethering dog 40 outside the truck. When the disconnected leash 12 is used as a regular walking tether, shock absorber 14 serves as a handle and helps to prevent injury to the person as well as dog 40. Main cable 10 may also be disconnected by the use of the snap connectors attached to both distal ends, and used to extend leash 12 when walking or tethering dog 40 elsewhere. Leash 12 may be left attached to main cable 10 once main cable 10 is disconnected from the truck and used as a double tether for walking two dogs 40 at one time.

To utilize pickup bed 28 for hauling cargo, main cable 10 with leash 12 can be disconnected from both hinges 30 by way of the snap connectors 16. The first hinge 30 connected to front wall 32 of pickup bed 28, or tool box 42, will lie flat against the surface and create very little, if any, obstruction. The second hinge 30, attached to floor 34, lies flush or below the upper surface of the corrugated floor 34 and will not interfere with the loading or unloading of freight.

In the foregoing specification, main cable 10 and leash 12 are both described as having shock absorbers 14 in-line between the two snap connectors 16 of each cable. This double shock absorbing structure has been found to protect the dog's 40 neck from injury from every direction of pull. However, one shock absorber 16 in either one or the other cable will function suitably well, but will give a lesser degree of protection to the dog's neck.

Although I have described my invention in detail in the previous specification, it will be obvious to those skilled in the art that modifications may be made to the structure of the invention as shown and described without departing from the scope of the appended claims.

I claim:

1. An animal tethering apparatus in combination with a cargo bed of a vehicle, and which comprises:

a main cable means having a first end and a second end with each said end having an openable connector means affixed thereto;

a first fixture means attached at a front end of said cargo bed;

a second fixture means attached to a bottom panel of said cargo bed adjacent a rear end of said cargo bed;

said first fixture means and said second fixture means each receiving one of said openable connector means of said main cable means, whereby said main cable means is retained in a generally taut position centrally longitudinally aligned between two sides of said cargo bed;

stop means, said stop means being adjustably attached to said main cable means between said first end and said second end of said main cable means;

a secondary cable means having a first and a second end;

said first end of said secondary cable means having an openable connector means affixed thereto, for removably attaching to a restraint device affixed to an animal;

said second end of said secondary cable means having an openable connector means affixed thereto, and removably attached to said main cable means; so as to allow said attached openable connector means to slide on said main cable means towards and away from said first end and said second end of said main cable means with said sliding of said openable connector means of said secondary cable means being restricted in movement by said stop means;

said secondary cable means being of a length to prohibit said animal when attached by said secondary cable means to said main cable means from escaping said cargo bed of said vehicle;

there being at least one shock absorbing means affixed in-line between the first end and second end of at least one said cable means.

2. The animal tethering apparatus according to claim 1 wherein said openable connector means are spring biased swivel snap connectors.

3. The animal tethering apparatus according to claim 1 wherein said first and said second fixture means are hasp-like hinges.

4. The animal tethering apparatus according to claim 1 wherein said stop means is two cable clamps affixed to said main cable means and adjustably spaced apart from each other.

5. The animal tethering apparatus according to claim 1 wherein said at least one shock absorbing means is a spring biased shock absorber in a handle-like housing.

* * * * *